US010223702B2

(12) United States Patent
Karidi et al.

(10) Patent No.: US 10,223,702 B2
(45) Date of Patent: Mar. 5, 2019

(54) INTEGRATION OF RESERVED AND DYNAMIC ADVERTISEMENT ALLOCATIONS

(75) Inventors: Ron J. Karidi, Herzeliya (IL); Moshe Tennenholtz, Haifa (IL); Roy Varshavsky, Even Yehuda (IL)

(73) Assignee: MICROSOFT TECHNOLOGY LICENSINGM LLC, Redmond (*) Notice: Subject to any disclaimer, the term of this patent is extended or adjusted under 35 U.S.C. 154(b) by 1485 days.

(21) Appl. No.: 12/967,394

(22) Filed: Dec. 14, 2010

(65) Prior Publication Data
US 2012/0150656 A1 Jun. 14, 2012

(51) Int. Cl.
G06Q 30/00 (2012.01)
G06Q 30/02 (2012.01)
G05B 19/418 (2006.01)

(52) U.S. Cl.
CPC ......... *G06Q 30/02* (2013.01); *G06Q 30/0269* (2013.01); *G06Q 30/0275* (2013.01)

(58) Field of Classification Search
None
See application file for complete search history.

(56) References Cited

U.S. PATENT DOCUMENTS

| 7,707,053 | B2 | 4/2010 | Veach | |
| 7,792,713 | B1 | 9/2010 | Kinney, Jr. | |
| 2006/0277135 | A1 | 12/2006 | Jain | |
| 2007/0260514 | A1 | 11/2007 | Burdick | |
| 2008/0097838 | A1 | 4/2008 | Lin | |
| 2010/0161408 | A1 | 6/2010 | Karson | |
| 2011/0131099 | A1* | 6/2011 | Shields et al. | 705/14.71 |
| 2011/0258056 | A1* | 10/2011 | Ioffe et al. | 705/14.73 |

OTHER PUBLICATIONS

"Insights and analyses of online auctions"—by R Bapna—2001 Magazine: Communications of the ACM vol. 44 Issue 11, Nov. 2001. pp. 42-50 .New York, NY, USA.*
"Born to trade: A genetically evolved keyword bidder for sponsored search". Munsey, M. Veilleux, etc. ISBN 978-1-4244-6911-6. IEEE Congress on Evolutionary Computation (pp. 1-8). Jul. 1, 2010. (Year: 2010).*

(Continued)

*Primary Examiner* — Maria V Vanderhorst
(74) *Attorney, Agent, or Firm* — Shook, Hardy & Bacon, L.L.P.

(57) ABSTRACT

Systems, methods, and computer media for integrating requests for reserved allocations of advertisement impressions and requests for dynamic allocations of advertisement impressions are provided. A request is received from a first advertiser to purchase a reserved allocation of advertisement impressions. The request specifies a requested number of impressions that each have one or more requested attributes. One or more bids to dynamically purchase one or more impressions through a real-time bidding process are received from an external bidding agent. An internal bidding agent bids, on behalf of the first advertiser, to dynamically purchase one or more impressions through the real-time bidding process until the request from the first advertiser to purchase the reserved allocation of impressions is satisfied.

20 Claims, 4 Drawing Sheets

(56) References Cited

OTHER PUBLICATIONS

Rosenkrans, Ginger, "Online Auctions as Advertising Revenue in the Media Mix", 2005, vol. 6, No. 1, 20 pages, http://jiad.org/article66.

Zucker, Bennett, "Online Ad Optimization and the Real-Time Bidding (RTB) Opportunity," Retrieved Sep. 8, 2010, 32 pages, http://www.masternewmedia.org/online-ad-optimization-and-the-real-time-bidding-rtb-opportunity/.

Ghosh, et al., "Bidding for Representative Allocations for Display Advertising," Retrieved Sep. 8, 2010, 12 pages, http://docs.google.com/viewer?a=v&q=cache:Z-o_ShruXiUJ:research.yahoo.com/files/randbids.pdf+online+auction+bid+for+advertisement+impressions&hl=en&gl=in&pid=bl&srcid=ADGEESj6HovgbPhEuOfq1Qz-q9w79FzYp4iFsPz0xH2sqHTqZmEgWJDw-JUYeMz9Zq4z5MD26b-8xr0QEvfkTeE15ud6yl4qZsV4esN7fFv1ukL35dD9f1-pJrCtGLsutYeqY0DSHqjU&sig=AHIEtbSzdtfqifcHUrFvb2Otf4pQrJj7Fw.

Smolin, Philip, "The fundamentals of real-time bidding," Aug. 23, 2010, 3 pages, iMedia Communications, Inc. http://www.imediaconnection.com/content/27430.asp.

* cited by examiner

INTEGRATION OF RESERVED AND DYNAMIC ADVERTISEMENT ALLOCATIONS

BACKGROUND

The importance of online advertising has increased tremendously as Internet use has become an integral part of daily life for many people. Revenue from providing online advertisements and sales that result from online advertisements now account for a large portion of the revenue earned by many companies. Advertisers have conventionally negotiated a per-impression price with publishers for displaying a fixed number of individual advertisement impressions. The fixed number of impressions are then displayed on web pages for an agreed-upon time period.

This established paradigm is shifting. Some publishers have begun to sell individual advertisement impressions through a real-time bidding process. The real-time bidding process is inherently incompatible with the idea of reserving impressions for particular clients in advance. Publishers are faced with the dilemma of continuing to provide traditional reserved contracts to existing clients while attempting to accommodate interest in real-time bidding.

SUMMARY

Embodiments of the present invention relate systems, methods, and computer media for providing search advertisements in a local language. Using the systems, methods, and media described herein, a request is received from a first advertiser to purchase a reserved allocation of advertisement impressions (impressions). An impression is a single displayed instance of an online advertisement, the impression having one or more attributes describing a user to whom the impression will be displayed (attributes). The request to purchase a reserved allocation of impressions specifies a requested number of impressions that each have one or more requested attributes. One or more bids to dynamically purchase one or more impressions through a real-time bidding process that accepts bids for an impression just before the impression is displayed on a web page for a user are received from an external bidding agent. An internal bidding agent bids, on behalf of the first advertiser, to dynamically purchase one or more impressions through the real-time bidding process until the request from the first advertiser to purchase the reserved allocation of impressions is satisfied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Embodiments of the present invention are described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention provide systems, methods, and computer media for integrating reserved advertisement allocations and dynamic advertisement allocations. As discussed above, online advertisement impressions are conventionally sold in reserved allocations in which an advertiser negotiates a contract with a publisher for a fixed number of impressions. More recently, publishers have begun to sell dynamic allocations of impressions. That is, individual impressions are sold through a real-time bidding process. These two different approaches to selling impressions are fundamentally incompatible.

As used herein, an advertisement impression (impression) is defined as a single displayed instance of an online advertisement. The impression has one or more attributes describing a user to whom the impression will be displayed (attributes). While it is recognized that online advertisements can have attributes such as display date ranges, contact information, version numbers, etc, the impression attributes are concerned instead with characteristics of the user to whom the impression will be presented.

An additional complication is the emergence of demand-side platforms (DSPs). DSPs are sophisticated bidding agents that analyze impressions and adjust bids accordingly on behalf of advertisers represented by the DSP. A DSP is able to analyze an impression through various means and determine a relative value of the impression to an advertiser based on the impression's attributes. The DSP may be able to determine, for example, that if an impression has a certain combination of attributes, a conversion (product or service actually purchased after an advertisement is presented) is much more likely. The DSP can then strategically bid to win more of such impressions.

In accordance with embodiments of the present invention, requests for reserved allocations of impressions can be integrated with requests for dynamic allocations of impressions. The publisher acts as a bidding agent for the reserved customer and participates in a real-time bidding process on the customer's behalf. The publisher can then ensure that the reserved customer gets the agreed-upon number of impressions specified in the reserved contract while also allowing non-reserved customers to bid in the real-time process.

Embodiments of the present invention also account for the presence of demand-side platforms (DSPs) by ensuring that reserved customers receive a substantially random distribution of impressions having requested attributes and do not receive a disproportionately low number of impressions identified by a DSP as desirable. These impressions may also be desirable to reserved customers, and DSPs winning bids for a disproportionately high share of these impressions can result in reserved customers losing bids for a disproportionately high share. This can cause the average conversion rate for the reserved customer to drop relative to the average conversion rate before DSPs began bidding. If the reserved customers' average conversion rate falls, reserved customers will begin to feel that they are receiving less value for their investment and may attempt to renegotiate their contracts to a lower cost or pursue a relationship with a different publisher.

Reserved customers can be ensured a substantially random distribution and thus a proportional share of desirable impressions through two approaches. The publisher, acting as bidding agent for a reserved customer, can observe the bids placed by a DSP, learn how the DSP has categorized impressions, and adjust bids placed on behalf of the reserved customer accordingly. The publisher may also calculate a probability for submitting a bid within a value range and submit bids accordingly.

In one embodiment, a request from a first advertiser to purchase a reserved allocation of advertisement impressions (impressions) is received. An impression is a single displayed instance of an online advertisement, the impression having one or more attributes describing a user to whom the impression will be displayed (attributes). The request to purchase a reserved allocation of impressions specifies a requested number of impressions that each have one or more requested attributes. One or more bids to dynamically purchase one or more impressions through a real-time bidding process that accepts bids for an impression just before the impression is displayed on a web page for a user are received from an external bidding agent. An internal bidding agent bids, on behalf of the first advertiser, to dynamically purchase one or more impressions through the real-time bidding process until the request from the first advertiser to purchase the reserved allocation of impressions is satisfied.

In another embodiment, a reserved allocation request intake component receives requests to purchase reserved allocations of advertisement impressions (impressions). An impression is a single displayed instance of an online advertisement, the impression having one or more attributes describing a user to whom the impression will be displayed (attributes). A request to purchase a reserved allocation of impressions specifies a requested number of impressions that each have one or more requested attributes. An internal bidding agent satisfies requests to purchase reserved advertisement allocations by bidding on and purchasing impressions through a real-time bidding process until the requested number of impressions for a request has been purchased. A bidding engine implements a real-time bidding process that (1) accepts bids for impressions from the internal bidding agent and one or more external bidding agents on a real-time basis just before the impression is displayed on a web page for a user and (2) awards each impression to the winning bidding agent.

In still another embodiment, a request from a first advertiser to purchase a reserved allocation of advertisement impressions (impressions) is received. An impression is a single displayed instance of an online advertisement, the impression having one or more attributes describing a user to whom the impression will be displayed (attributes). The request to purchase a reserved allocation of impressions specifies a requested number of impressions that each have one or more requested attributes.

One or more bids to dynamically purchase one or more impressions through a real-time bidding process that accepts bids for an impression just before the impression is displayed on a web page for a user are received from an external bidding agent. The impressions bid on by the external bidding agent that have the attributes requested by the first advertiser are categorized into two or more impression types, each impression type defined by the presence of at least one attribute not specified by the first advertiser in the request. The bid price is determined based on the impression type. The bid price reflects the impression's value to an advertiser represented by the external bidding agent.

An internal bidding agent bids on behalf of the first advertiser to dynamically purchase one or more impressions through the real-time bidding process until the request from the first advertiser to purchase the reserved allocation of impressions is satisfied. The bids placed on behalf of the first advertiser by the internal bidding agent are placed and priced such that the impressions purchased to satisfy the request include approximately proportional percentages of each impression type as compared to the total number of impressions having the requested attributes and that are available for bidding.

Figure 1:
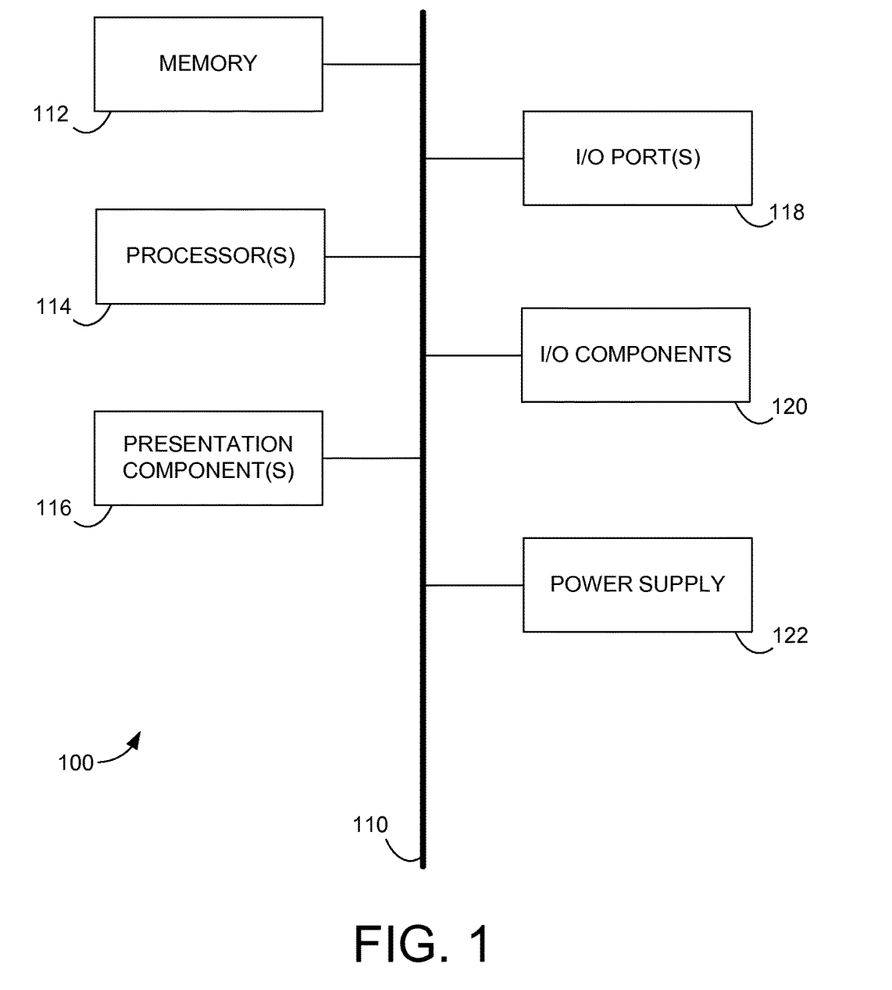
FIG. 1 is a block diagram of an exemplary computing environment suitable for use in implementing embodiments of the present invention.

Having briefly described an overview of some embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present invention may be practiced in a variety of system configurations, including hand-held devices, consumer electronics, general-purpose computers, more specialty computing devices, etc. Embodiments of the present invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As discussed previously, embodiments of the present invention provide systems, methods and computer media for integrating reserved advertisement allocations and dynamic advertisement allocations. Embodiments of the present invention will be discussed with reference to FIGS. 2-5.

Figure 2:
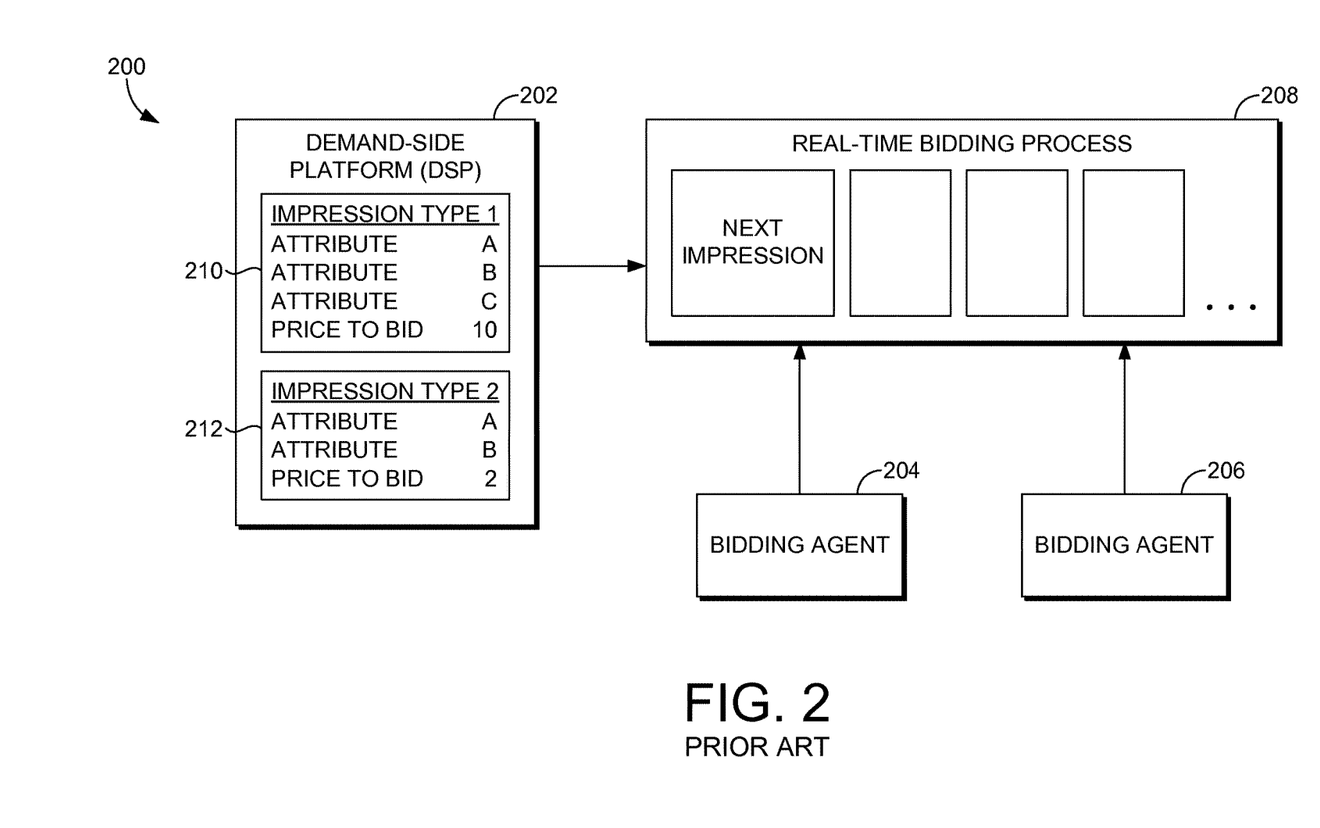
FIG. 2 is a block diagram of a prior art real-time bidding arrangement in which a demand-side platform (DSP) participates.

FIG. 2 illustrates a prior art real-time bidding arrangement 200. Demand-side platform (DSP) 202 and bidding agents 204 and 206 purchase impressions through real-time bidding process 208. Bidding agents 204 and 206 may be advertisers, other DSPs, or bidding agents without the capabilities of a DSP. As discussed above, DSPs are sophisticated bidding agents that analyze impressions and strategically price bids to win impressions determined to be desirable. A DSP analyzes impression attributes to determine a relative value of the impression to an advertiser based on the impression's attributes. In many cases, the DSP may have information about impressions not available to the publisher or analyzed in a way that is unknown to the publisher. The DSP uses its information advantage to strategically win bids.

An advertiser typically requests impressions having specific attributes. For example, if the advertiser is advertising women's snow boots, the advertiser might be interested in impressions displayed to users who are women and who live in cold climates. The advertiser would then specify that it would like to buy impressions having both of these attributes.

In FIG. 2, DSP 202 has received a request to purchase impressions having both attributes A and B. DSP 202 has analyzed the impressions having at least attributes A and B and categorized these impressions into two types, impression type 1 210 and impression type 2 212. Impressions of type 1 include attributes A, B, and C and have a bid price of $10. Impressions of type 2 include only attributes A and B and have a bid price of $2. DSP 202 has determined that the presence of attribute C makes conversion more likely. DSP 202 then assigns impression type 1 a price to bid of $10. In contrast, impressions of impression type 2 do not have attribute C. As these impressions are less likely to lead to conversion, the price to bid for these impressions is only $2. Attribute C may be any of a number of types of information. For example, attribute C might indicate the career type or job title of the user to whom the impression will be displayed. Attribute C might also indicate that this particular user has a high overall conversion rate based on a user history, indicating that this user is likely to buy an item when presented with an advertisement for the item. The real-time bidding arrangement 200 in FIG. 2 is incompatible with a conventional reserved allocation system.

Figure 3:
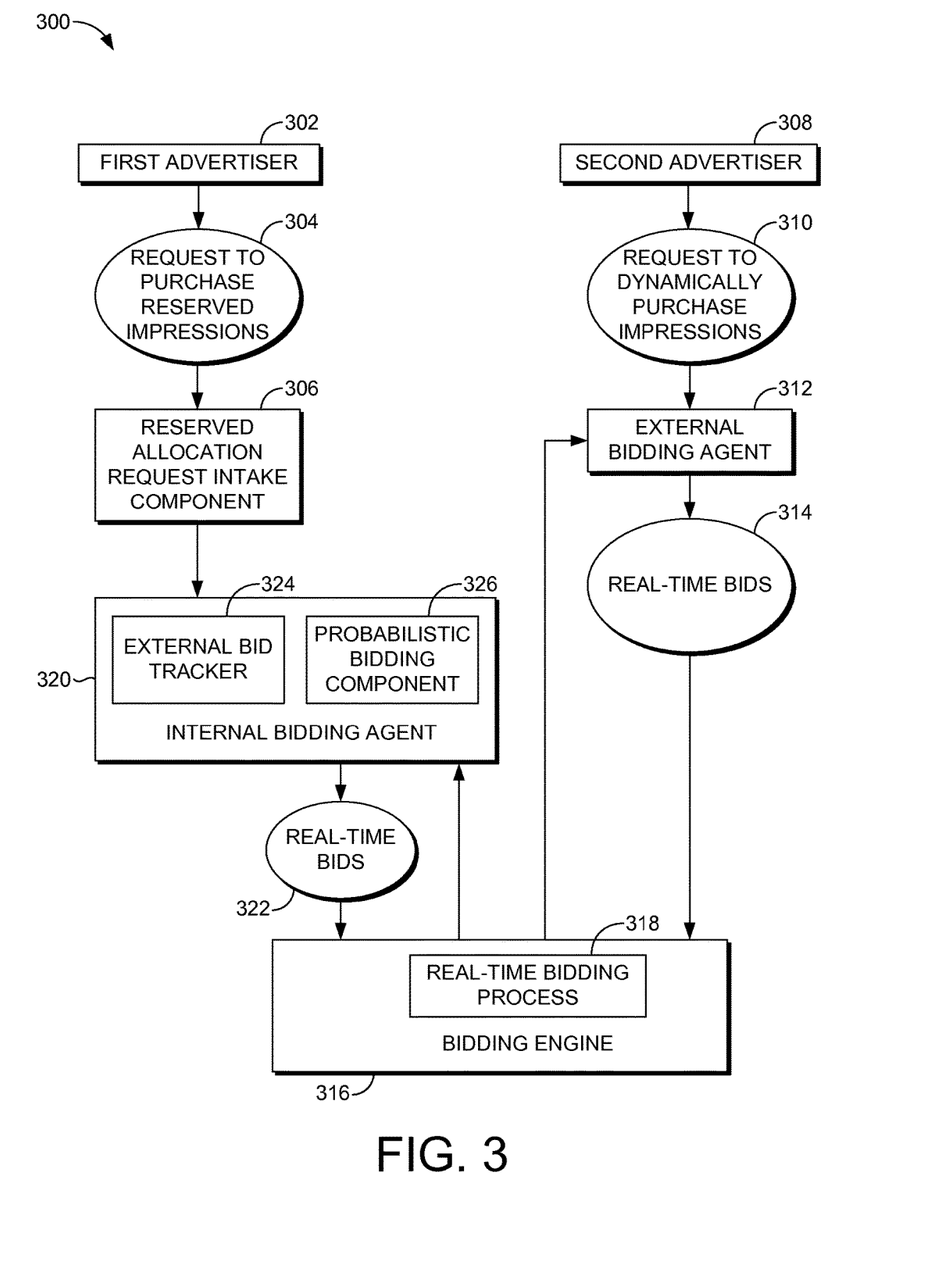
FIG. 3 is a block diagram of an exemplary system for integrating reserved advertisement allocations and dynamic advertisement allocations.

FIG. 3 illustrates a system for integrating reserved advertisement allocations and dynamic advertisement allocations in accordance with embodiments of the present invention. First advertiser 302 submits a request 304 to purchase a reserved allocation of impressions. Request 304 is received by reserved allocation request intake component 306. Request 304 specifies a requested number of impressions that each have one or more requested attributes. Second advertiser 308 is similarly interested in purchasing impressions having the one or more requested attributes and submits a request 310 to dynamically purchase impressions. External bidding agent 312, which may be a DSP, other sophisticated bidding agent, or bidding agent not having sophisticated abilities, submits real-time bids 314 to bidding engine 316. In some embodiments, second advertiser 308 submits bids directly to bidding engine 316. Bidding engine 316 accepts bids for an impression just before the impression is displayed on a web page for a user and implements real-time bidding process 318. In this way, second advertiser 308 bids on impressions on a real-time basis.

Rather than bid in real time, first advertiser 302 has submitted request 304 to purchase a reserved allocation. Request 304 is communicated from intake component 306 to internal bidding agent 320. Internal bidding agent 320 submits bids 322 on behalf of first advertiser 302 to dynamically purchase impressions through real-time bidding process 318 until request 304 from first advertiser 302 to purchase the reserved allocation of impressions is satisfied. Internal bidding agent 320 essentially converts a reserved request into a series of real-time bids 322 submitted to satisfy request 304. In this way, both requests to purchase reserved allocations of impressions and requests to purchase dynamic allocations of impressions can be accommodated.

In some embodiments, a bid price is empirically determined that is high enough to ensure that the requested number of impressions is won. Internal bidding agent 320 may submit real-time bids 322 at substantially equal time intervals until request 304 is satisfied. In other embodiments, the time between bids or won bids is not critical so long as the number of impressions agreed upon in a negotiated contract is purchased within the defined time period.

As discussed above, external bidding agent 312 may be a DSP. For each bid received from DSP 312, the bid price is determined by DSP 312 based on an evaluation of one or more attributes of the impression. The bid price reflects the impression's value to second advertiser 308, who is represented by DSP 312. In some embodiments, one or more of the attributes evaluated by external bidding agent 312 to determine the price of each bid are not attributes specified by first advertiser 302 in the request 304 to purchase the reserved allocation of impressions. The attributes evaluated by DSP 312 may or may not be known to internal bidding agent 320. As discussed above, when external bidding agent 312 is a DSP, DSP 312 may have information about the impressions that will be bid on that internal bidding agent 320 does not have.

Even when the attributes considered by DSP 312 but that are not requested by first advertiser 302 are known to internal bidding agent 320, DSP 312 may have additional insight and consider the known-but-not-specified attribute differently than internal bidding agent 320 and therefore assign less or more value to impressions with the known attribute.

In some embodiments, internal bidding agent 320 considers any impression having the one or more requested attributes specified in request 304 to be a valid impression to satisfy request 304. In one particular embodiment, a bid price high enough to ensure the requested number of impressions is met is empirically identified and bid for each impression. In such an embodiment, first advertiser 302 may be at a disadvantage as compared to second advertiser 308, because external bidding agent 312 may be able to identify impressions that are more valuable than others to second advertiser 308 (and therefore likely more valuable to first advertiser 302).

The information provided by DSP 312 may be information that leads DSP 312 to conclude that an impression is more likely to lead to conversion, but this information may be advertiser-specific. That is, while it may be true that the presence of an attribute means an increased likelihood of conversion for second advertiser 308, it is not necessarily true that impressions with the attribute will lead to increased conversion for first advertiser 302. In some cases, however, the attributes that lead DSP 312 to conclude an impression is valuable may apply to all advertisers.

Although both reserved and dynamic impression allocation can be accomplished through system 300 in FIG. 3, first advertiser 302 may become dissatisfied if DSP 312 purchases a disproportionate share of impressions that DSP 312 determines are valuable and alters the random distribution of impressions having the requested attributes that first advertiser 302 was expecting. In some embodiments, internal bidding agent 320 includes one or both of external bid tracker 324 and probabilistic bidding component 326.

External bid tracker 324 and/or probabilistic bidding component 326 are employed by internal bidding agent 320 to ensure first advertiser 302 wins a proportional number of highly valued impressions to substantially maintain a random distribution. For example, if DSP 312 determines that 12% of impressions having the requested attributes specified by first advertiser 302 and second advertiser 308 have a high likelihood of conversion, DSP 312 will bid higher for each of these impressions to ensure it places the winning bids, thus delivering a high conversion rate for second advertiser 308. Internal bidding agent 302 seeks to ensure that it wins a proportional number of the valuable bids for first advertiser 302. Thus, internal bidding agent 320 places and prices bids such that approximately 12% of the impressions it wins are impressions that DSP 312 determined had a high likelihood of conversion. In this way, first advertiser 302 is provided the same distribution of impressions (and therefore same average conversion rate) it received before DSPs began leveraging their knowledge to win preferred impressions. This distribution is essentially a random distribution over a large enough sample size.

In some embodiments, the impressions bid on by DSP 312 that have the attributes requested by first advertiser 302 are categorized by DSP 312 into two or more impression types, each impression type defined by the presence of at least one attribute not specified by first advertiser 302 in request 304. Each impression type is then assigned a bid price based on the perceived value to second advertiser 308.

In some embodiments, the bids placed on behalf of first advertiser 302 by internal bidding agent 320 are placed and priced such that the impressions purchased to satisfy request 304 include approximately proportional percentages of each impression type as compared to the total number of impressions having the requested attributes and that are available for bidding. In one embodiment, the impression types into which DSP 312 categorizes impressions having at least the attributes requested in request 304 include a first impression type constituting a first percentage of the impressions available for bidding having the requested attributes and a second impression type constituting a second percentage of the impressions available for bidding having the requested attributes. The impressions purchased by internal bidding agent 320 to satisfy request 304 of first advertiser 302 include approximately the first percentage of impressions of the first impression type and approximately the second percentage of impressions of the second impression type. Thus, in such embodiments, if DSP 312 has determined that the available impressions having the requested attributes can be categorized as 10% type 1 and 90% type 2, then internal bidding agent 320 seeks to ensure that approximately 10% of won bids are type 1 and approximately 90% are type 2.

Such proportionality can be ensured by employing either external bid tracker 324 or probabilistic bidding component 326. External bid tracker 324 observes the bids placed by DSP 312. Internal bidding agent 320 employs external bid tracker 324 to adjust bids to ensure that approximately proportional percentages of each impression type are purchased by internal bidding agent 320. Essentially, internal bidding agent 320 "learns" how DSP 312 is categorizing impressions based on historical bid information and/or the bid price observed by external bid tracker 324.

In one embodiment, external bid tracker 324 accesses historical records of past bids placed by DSP 312 for impressions having the requested attributes and/or observes bids as they are placed to analyze the range of prices bid as well as the individual bids. As DSP 312 bids on an impression, the bid is observed by external bid tracker 324 and tracked according to price. As real-time bidding process 318 continues, internal bidding agent 320 then places and prices bids to ensure that a proportional percentage of the bids placed by DSP 312 in each price category are won by internal bidding agent 320.

In another embodiment, external bid tracker 324 accesses historical information about winning bids for impressions having the attributes requested in request 304. Internal bidding agent 320 then determines a winning bid price range, divides the winning bid range into a number of regions, and calculates the distribution of winning bids over the regions. Internal bidding agent 320 then seeks to win a proportional distribution for first advertiser 302.

For example, if a winning bid range is determined to extend from $2-$12, internal bidding agent 320 may divide this range into six regions: $2-$3.99; $4-$5.99; $6-$7.99, etc. The distribution of winning bids in each region is then calculated based on the winning bids, for example: $2-$3.99=30%; $4-$5.99=15%, etc. Internal bidding agent 320 then bids such that when internal bidding agent 320 has satisfied request 304, approximately 30% of the impressions won are in the $2-$3.99 category, approximately 15% are in the $4-$5.99 category, etc.

In other embodiments, it is ensured that the impressions purchased by internal bidding agent 320 to satisfy the request include approximately proportional percentages of each impression type as compared to the total number of impressions having the requested attributes and that are available for bidding by employing probabilistic bidding component 326. Probabilistic bidding component 326 determines a probability p for submitting a bid within a value range from a to b. Internal bidding agent 320 then submits random bids according to probability p that the bid will be won. The parameters p, a, and b are adjusted and optimized through trial and error so that sufficient impressions are won. Selection of p, a, and b provides the desired proportionality of purchased impression types.

The functionality of reserved allocation request component 306, internal bidding agent 320, external bid tracker 324, and probabilistic bidding component 326 may be included on one or multiple actual components. Bidding engine 316 can accept bids from a number of external bidding agents or advertisers, including a number of DSPs.

Additionally, internal bidding agent 320 may act as a bidding agent for multiple advertisers who each request to purchase a reserved allocation of impressions. In such embodiments, internal bidding agent 320 may submit separate bids for each of the multiple advertisers. Additional internal bidding agents may be implemented that each bid for a single advertiser. For both embodiments with a single internal bidding agent and embodiments with multiple internal bidding agents, bidding may be coordinated through a centralized scheduler to ensure each of the multiple advertisers wins the correct number and type of impressions. The scheduler may be a separate component. In some embodiments, the functionality of the scheduler may be incorporated into an internal bidding agent.

Figure 4:
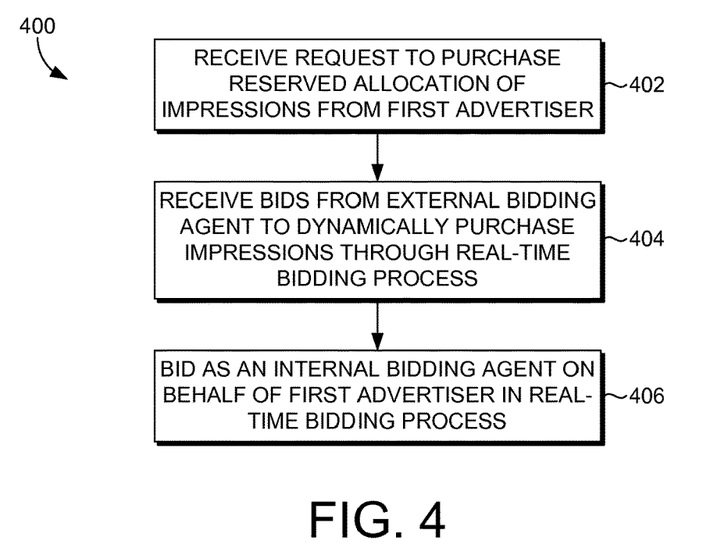
FIG. 4 is a flow chart of an exemplary method for integrating reserved advertisement allocations and dynamic advertisement allocations.

FIG. 4 illustrates a method 400 for integrating reserved and dynamic allocations of impressions. In step 402, a request to purchase a reserved allocation of impressions is received from a first advertiser. In step 404, bids are received from an external bidding agent to dynamically purchase impressions through a real-time bidding process. Real-time bids are submitted in step 406 by the system acting as an internal bidding agent representing the first advertiser. Thus, the first advertiser's request to purchase a reserved allocation of impressions is converted such that the reserved request is integrated with dynamic requests (real-time bids).

Figure 5:
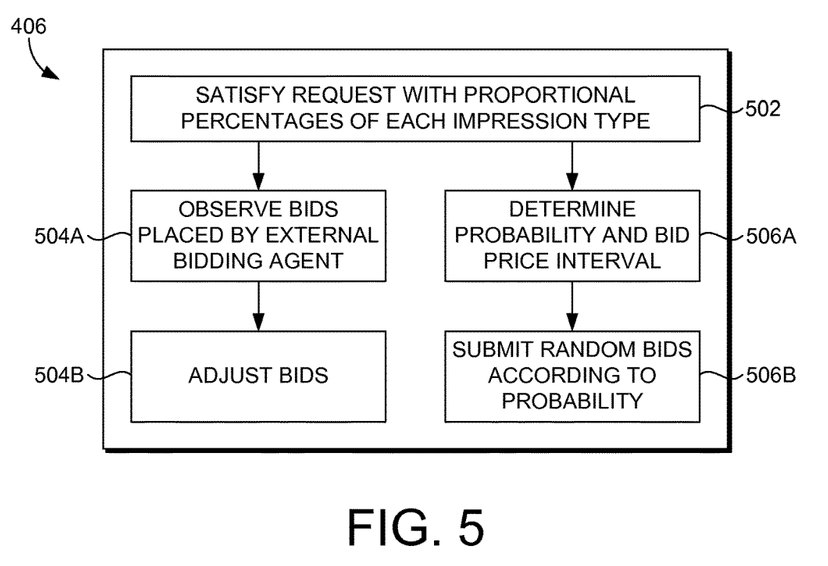
FIG. 5 is a flow chart illustrating two exemplary implementations of step 406 of FIG. 4.

FIG. 5 illustrates two implementations of step 406 in FIG. 4 used when the external bidding agent is a DSP or other type of sophisticated bidding agent. The steps in FIG. 5 enable the internal bidding agent to preserve a substantially random distribution of impressions won even though a DSP is actively attempting to win mostly impressions it has determined have a high value. In step 502, the bidding conducted by the internal bidding agent on the first advertiser's behalf satisfies the reserved request with proportional percentages of each impression type identified by the DSP. In step 504A, current and/or historical bids placed by the DSP are observed. The internal bidding agent adjusts its bids accordingly to ensure that a proportional percentage of each impression type is won in step 504B. In some embodiments, historical and/or current bid information is not available. In such cases, configurable parameters defining a probability of winning a bid and a bid range are optimized through trial and error in step 506A. Bids according to the optimized parameters are submitted in step 506B.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

Having thus described the invention, what is claimed is:

1. One or more computer storage hardware devices storing computer-executable instructions that, when executed by one or more computing devices each having a processor and a memory, cause the one or more computing devices to perform a method for integrating reserved advertisement allocations and dynamic advertisement allocations, the method comprising:
   receiving a request from a first advertiser to purchase a reserved allocation of advertisement impressions (impressions),
   wherein an impression is a single displayed instance of an online advertisement, the impression having one or more attributes describing a user to whom the impression will be displayed (attributes), and
   wherein the request to purchase a reserved allocation of impressions specifies a number of impressions requested by the first advertiser that each have one or more attributes requested by the first advertiser;
   receiving one or more bids from an external bidding agent to dynamically purchase one or more impressions through a real-time bidding process that accepts bids for an impression just before the impression is displayed on a web page for a user; and
   bidding, as an internal bidding agent on behalf of the first advertiser, to dynamically purchase one or more impressions through the real-time bidding process until the request from the first advertiser to purchase the reserved allocation of impressions is satisfied,
   wherein the internal bidding agent adjusts its bid prices, at least in part, based on bid prices associated with the one or more bids from the external bidding agent.

2. The one or more computer storage hardware devices of claim 1, wherein the internal bidding agent bids on behalf of the first advertiser to purchase impressions at substantially equal time intervals until the request is satisfied.

3. The one or more computer storage hardware devices of claim 1, wherein any impression having the one or more attributes requested by the first advertiser counts toward the number of impressions requested by the first advertiser.

4. The one or more computer storage hardware devices of claim 1, wherein for each bid received from the external bidding agent, the bid price is determined by the external bidding agent based on an evaluation of one or more attributes of the impression, and wherein the bid price reflects the impression's value to an advertiser represented by the external bidding agent.

5. The one or more computer storage hardware devices of claim 4, wherein at least one of the one or more attributes evaluated by the external bidding agent to determine the price of each bid is an attribute not requested by the first advertiser in the request to purchase the reserved allocation of impressions.

6. The one or more computer storage hardware devices of claim 4, wherein at least one of the one or more attributes evaluated by the external bidding agent to determine the price of each bid is unknown to the internal bidding agent.

7. The one or more computer storage hardware devices of claim 5, wherein at least one of the one or more attributes evaluated by the external bidding agent is an attribute requested by the first advertiser in the request to purchase the reserved allocation of impressions, and wherein the impressions bid on by the external bidding agent that have attributes requested by the first advertiser are categorized into two or more impression types, each impression type defined by the presence of at least one attribute not requested by the first advertiser in the request to purchase the reserved allocation of impressions, and
   wherein the bids placed on behalf of the first advertiser by the internal bidding agent are placed and priced such that the impressions purchased to satisfy the request include approximately proportional percentages of each impression type as compared to the total number of impressions having the attributes requested by the first advertiser that are available for bidding.

8. The one or more computer storage hardware devices of claim 7, wherein the impression types include a first impression type constituting a first percentage of the impressions available for bidding having the requested attributes and a second impression type constituting a second percentage of the impressions available for bidding having the requested attributes, and
   wherein the impressions purchased by the internal bidding agent to satisfy the first advertiser's request include approximately the first percentage of impressions of the first impression type and approximately the second percentage of impressions of the second impression type.

9. The one or more computer storage hardware devices of claim 1, wherein the internal bidding agent employs an external bid tracker to observe the bids placed by the external bidding agent and adjust its bid prices to ensure that approximately proportional percentages of each impression type are purchased.

10. The one or more computer storage hardware devices of claim 1, wherein the internal bidding agent includes a probabilistic bidding component that adjusts its bid prices by determining a probability p for submitting a bid within a value range from a to b and submitting random bids according to the probability p.

11. A system for integrating reserved advertisement allocations and dynamic advertisement allocations, the system comprising:
   a reserved allocation request intake component that receives requests to purchase reserved allocations of advertisement impressions (impressions), wherein an impression is a single displayed instance of an online advertisement, the impression having one or more attributes describing a user to whom the impression will be displayed (attributes), and wherein a request to purchase a reserved allocation of impressions specifies a requested number of impressions that each have one or more requested attributes;
   an internal bidding agent that satisfies requests to purchase reserved advertisement allocations by bidding on and purchasing impressions through a real-time bidding process until the requested number of impressions for a request has been purchased; and
   a bidding engine that implements a real-time bidding process that (1) accepts bids for impressions from the internal bidding agent and one or more external bidding agents on a real-time basis just before the impression is displayed on a web page for a user and (2) awards each impression to the winning bidding agent, wherein the internal bidding agent adjusts its bid prices, at least in part, based on bid prices associated with one or more bids from the one or more external bidding agents.

12. The system of claim 11, wherein for each bid received by the bidding engine from a first external bidding agent, the bid price is determined by the first external bidding agent based on an evaluation of one or more attributes of the impression, and wherein the bid price reflects the impression's value to an advertiser represented by the first external bidding agent.

13. The system of claim 12, wherein the allocation request intake component receives a first request to purchase a reserved allocation of impressions from a first advertiser, and wherein at least one of the one or more of the attributes evaluated by the first external bidding agent to determine the price of each bid is an attribute not requested by the first advertiser in the request to purchase the reserved allocation of impressions.

14. The system of claim 13, wherein at least one of the one or more attributes evaluated by the external bidding agent is an attribute requested by the first advertiser in the request to purchase the reserved allocation of impressions, and wherein the impressions bid on by the first external bidding agent that have attributes requested by the first advertiser are categorized into two or more impression types, each impression type defined by the presence of at least one attribute not requested by the first advertiser in the request, and
   wherein the internal bidding agent places and prices bids on behalf of the first advertiser such that the impressions purchased to satisfy the request include approximately proportional percentages of each impression type as compared to the total number of impressions having attributes requested by the first advertiser that are available for bidding.

15. The system of claim 14, further comprising an external bid tracker that observes the bids placed by the first external bidding agent, and wherein the internal bidding agent employs the external bid tracker to adjust bids to ensure that approximately proportional percentages of each impression type are purchased by the internal bidding agent.

16. The system of claim 14, further comprising a probabilistic bidding component that determines a probability p for submitting a bid within a value range from a to b, and wherein the internal bidding agent employs the probabilistic bidding component to submit random bids according to the probability p to ensure that approximately proportional percentages of each impression type are purchased.

17. A computer-implemented method for integrating reserved advertisement allocations and dynamic advertisement allocations, the method comprising:
   receiving a request from a first advertiser to purchase a reserved allocation of advertisement impressions (impressions), wherein an impression is a single displayed instance of an online advertisement, the impression having one or more attributes describing a user to whom the impression will be displayed (attributes), and wherein the request to purchase a reserved allocation of impressions specifies a number of impressions requested by the first advertiser that each have one or more attributes requested by the first advertiser;

receiving one or more bids from an external bidding agent to dynamically purchase one or more impressions through a real-time bidding process that accepts bids for an impression just before the impression is displayed on a web page for a user, wherein the impressions bid on by the external bidding agent that have the attributes requested by the first advertiser are categorized into two or more impression types, each impression type defined by the presence of at least one attribute not requested by the first advertiser in the request, wherein the bid price is determined based on the impression type, and wherein the bid price reflects the impression's value to an advertiser represented by the external bidding agent; and bidding, as an internal bidding agent on behalf of the first advertiser, to dynamically purchase one or more impressions through the real-time bidding process until the request from the first advertiser to purchase the reserved allocation of impressions is satisfied, wherein the bids placed on behalf of the first advertiser by the internal bidding agent are placed and priced such that the impressions purchased to satisfy the request include approximately proportional percentages of each impression type as compared to the total number of impressions having attributes requested by the first advertiser that are available for bidding; wherein the internal bidding agent adjusts its bid prices, at least in part, based on bid prices associated with the one or more bids from the external bidding agent.

18. The method of claim 17, wherein the impression types include a first impression type constituting a first percentage of the impressions available for bidding having the attributes requested by the first advertiser and a second impression type constituting a second percentage of the impressions available for bidding having the attributes requested by the first advertiser, and wherein the impressions purchased by the internal bidding agent to satisfy the first advertiser's request include approximately the first percentage of impressions of the first impression type and approximately the second percentage of impressions of the second impression type.

19. The method of claim 17, wherein the internal bidding agent ensures that approximately proportional percentages of each impression type are purchased by observing the bids placed by the external bidding agent and adjusting bid prices accordingly.

20. The method of claim 17, wherein the internal bidding agent ensures that approximately proportional percentages of each impression type are purchased by determining a probability p for submitting a bid within a value range from a to b and submitting random bids according to the probability p.

* * * * *